Patented July 12, 1938

2,123,384

UNITED STATES PATENT OFFICE 2,123,384

COPPER BASE ALLOY ARTICLE FOR BRAZING AND METHOD OF PREPARING IT

Horace F. Silliman, Waterbury, Conn., assignor to The American Brass Company, Waterbury, Conn., a corporation of Connecticut No Drawing. Application April 7, 1936, Serial No. 73,120

11 Claims. (Cl. 113—112)

My invention relates to the art of joining metals and more particularly to the art of joining copper alloys by soldering or brazing.

The object of my invention is to provide a surface on certain alloys such that these alloys can be hard soldered and brazed in a neutral or reducing atmosphere without the use of flux.

In the art of hard soldering and brazing, two metal surfaces are joined together by causing a molten metal or alloy to flow into a narrow interstice between them and there to solidify.

The molten alloy, termed the solder, always has a lower melting point than the metals being joined. Another desirable characteristic of a solder is that it have a low viscosity and a low surface tension, or, in other words, that it have a good fluidity at temperatures but little above the melting point. The copper-silver-zinc alloys, known as silver solders, and certain brasses are examples of commonly used brazing solders.

Silver solders usually contain:

| | Percent |
|---|---|
| Copper | 15 to 50 |
| Silver | 10 to 80 |
| Zinc | 5 to 40 | and sometimes cadmium. One brass often used for brazing contains:

| | Percent |
|---|---|
| Copper, approximately | 50 |
| Zinc, approximately | 50 |

Metal surfaces being joined by soldering or brazing do not fuse while the joint is being made. This feature serves to distinguish soldering or brazing from gas or electric arc welding where a metal or alloy corresponding to the solder is often used. In soldering or brazing the solder adheres to the metallic surfaces by a process of diffusion of liquid into solid metal, while in welding the metallic surfaces as well as the metal added to the joint all fuse and mix while liquid.

A common procedure in hard soldering or brazing is to coat the surfaces being joined with a film of solder and press the surfaces together while sufficient heat is applied to cause the solder to liquefy and flow. The joint is then cooled and as soon as the solder has solidified completely a more or less permanent union of the surfaces has been made.

A variation of this procedure is to place the solder, in the form of a foil, wire, tube, or powder between the surfaces instead of actually coating them.

Another common method of making the joint is to melt solder at an edge of the surfaces and allow it to be drawn by capillary action into the interstices.

Whatever the method of applying the solder, it is necessary to protect the surfaces of most metals and alloys. Otherwise the oxygen of the air reacts with the metal as the temperature is raised and forms a film of oxide and prevents the solder from wetting the surfaces and thus from adhering. One method of protecting the surfaces from oxidation is to coat them with a flux, that is, some material, usually but not necessarily an inorganic salt which melts easily and which can be easily pushed aside by, or rise up through, the molten solder. It is advantageous if the nature of the flux is such that it will dissolve any non-metallic film which might be formed.

In some brazed articles the use of a flux is objectionable because the residue which it leaves cannot be entirely removed and sooner or later it absorbs moisture and corrodes the metal. Also in some cases the flux has a tendency to pile up in certain places and act as a dam which prevents the solder from completely filling the joint.

A more recently developed method of protecting the surfaces from oxidation which also avoids the difficulties arising from the use of a flux is to carry out the brazing operation in a neutral or reducing atmosphere. Furnaces designed to operate while filled with an atmosphere of hydrogen or gas mixtures containing carbon monoxide or hydrogen are suitable for this purpose. The brazing of steel with copper or brass as a solder has become a profitable commercial operation within recent years.

Many copper alloys may also be soldered and brazed without flux by taking advantage of the protective action of a neutral or reducing atmosphere. Copper, copper-zinc alloys, and copper-tin alloys are often joined by this method. Some very desirable alloys from the standpoint of mechanical properties such as copper-silicon-manganese alloys, copper-nickel-aluminum alloys, and copper-beryllium alloys cannot be joined by brazing in a neutral atmosphere.

As the result of a long investigation, I have found that copper base alloys which contain appreciable amounts of magnesium, calcium, phosphorus, boron, aluminum, beryllium, silicon, chromium, vanadium, zirconium, titanium, or manganese cannot be brazed or hard soldered without flux in a neutral or reducing atmosphere. Many of the strongest and most desirable of the copper alloys thus are eliminated from consideration where a brazing operation of this type is necessary in the manufacture of an article. Furthermore, all of the up to this time commercially developed copper base alloys capable of precipitation hardening are excluded, for example, beryllium-copper, copper-nickel-silicon and copper-nickel-aluminum alloys. It is particularly desirable to have available for brazed articles alloys which can be hardened by heat treatment, because heating to the brazing temperature softens the alloys, and unless they can be hardened again by heat treatment at a lower temperature the mechanical properties are not good.

The gases comprising the neutral or reducing atmosphere always contain traces of impurities such as water vapor which cannot be entirely removed by any known commercial process. A copper alloy containing appreciable amounts of one or more of the elements listed in the paragraph above when heated in the neutral or reducing atmosphere immediately becomes coated with a film which probably is an oxide and the solder will not wet the surface. These films are formed even in hydrogen which contains but a trace of water vapor.

My investigation also proved that alloys containing beside copper, only one or more of the elements zinc, cadmium, tin, lead, iron, cobalt, nickel, gold, silver, tantalum, platinum, arsenic, selenium and tellurium can be brazed without a flux in neutral or reducing atmosphere. This fact is confirmed by the successful application of this type of brazing or hard soldering in the manufacture of articles from copper, brass, tin bronze and nickel silver.

I have found that alloys containing the interfering elements may be adapted for use in articles hard soldered or brazed without flux in a neutral or reducing atmosphere by treating them in such a manner that the surfaces to be joined are freed from the interfering elements. I may coat the alloy with a protective layer of copper, zinc, cadmium, tin, lead, iron, cobalt, nickel, gold, silver, tantalum, or platinum, or one of the alloys containing two or more of these metals only by electroplating, contact plating or hot dipping. When a metal more noble than the copper alloy, such for example as silver, is used as a protective coating it may be applied by dipping the alloy in an aqueous solution of a suitable salt of the noble metal.

I may also remove the interfering element or elements from the surface of the alloy by a chemical treatment and produce the same result as if a coating had been applied. For example, in the case of beryllium-copper alloys, I sometimes remove the beryllium by heating the alloy in a stream of chlorine, bromine, fluorine or iodine vapor, or I may heat the alloy in a molten salt bath which contains a constituent capable of combining with and removing the beryllium from the surface. In the molten salt treatment an alkali salt such as potassium-hydroxide or sodium carbonate, or halides, such as sodium chloride or barium chloride, are some of the effective compounds.

Still another way of utilizing alloys not otherwise capable of being brazed without flux in a neutral or reducing atmosphere is to produce a compound metallic sheet, rod, wire, tube, forging or profile by any of the usual methods. Thus for example I might cast a layer of copper alloy containing one or more of the undesirable elements and a layer of alloy free from undesirable elements in the same mold in such a manner as to produce a compound billet with the latter alloy forming one or more surfaces of the billet. This billet may then be rolled, drawn or extruded to the required shape. The coated copper alloy thus produced can be formed and brazed without flux in a neutral or reducing atmosphere just as if it were composed entirely of copper, zinc, cadmium, tin, lead, iron, cobalt, nickel, gold, silver, tantalum or platinum, or an alloy containing two or more of these metals only.

The thickness of the protective coating will be governed somewhat by the rate of diffusion of the undesirable element through the coating. For example, a coating of nickel can be only one-fifth as thick as a coating of copper and yet both will have the same protective action in preventing the formation of a film on a beryllium-copper alloy.

In practicing my invention I may coat the copper alloy with the protective metal or alloy at any time prior to the brazing operation. Thus, for example, I may coat the original cast billet or bar and work it down with the coating on, or I may coat the sheet, rod, tube, wire, forging, profile or other desirable form just before the final working, or I may coat the formed parts of an article just before brazing.

Also it may not be necessary to coat all the surfaces of an article and I may find it advantageous to coat only those surfaces which are to be brazed.

Having thus set forth the nature of my invention, what I claim is:

1. A method of making a fabricated structure comprising providing a member composed of a copper base alloy containing an appreciable amount of metal from the group composed of beryllium and aluminum, providing on said member a surface composed only of a copper alloy which is non-oxidizable when heated in a neutral or reducing atmosphere containing traces of oxygen, and brazing said member without a flux in said neutral or reducing atmosphere to another member which has a surface composed only of metal which is non-oxidizable when heated in this atmosphere.

2. A method of making a fabricated structure comprising providing a member composed of a copper base alloy containing an appreciable amount of a metal which renders the alloy oxidizable to form a thin oxide surface film when heated in a neutral or reducing atmosphere containing traces of oxygen, providing on said member a surface composed only of an alloy consisting of copper and metal from the group composed of iron, cobalt and nickel, and brazing said member without a flux in said neutral or reducing atmosphere to another member which has a surface composed only of metal which is non-oxidizable when heated in this atmosphere.

3. A method of making a fabricated structure comprising providing a member composed of a copper base alloy containing an appreciable amount of metal from the group composed of beryllium and aluminum, providing on said member a surface composed only of an alloy consisting of copper and metal from the group composed of iron, cobalt and nickel, and brazing said metal without a flux in a neutral or reducing atmosphere to another member which has a surface composed only of metal which is non-oxidizable when heated in this atmosphere.

4. A method of making a fabricated structure comprising providing a member composed of a copper base alloy containing an appreciable amount of metal from the group composed of beryllium and aluminum, coating said member with a protective layer composed only of a copper alloy which is non-oxidizable when heated in a neutral or reducing atmosphere containing traces of oxygen, and brazing said member without flux in said neutral or reducing atmosphere to another member which has a surface composed only of metal which is non-oxidizable when heated in this atmosphere.

5. A method of making a fabricated structure comprising providing a member composed of a copper base alloy containing an appreciable amount of metal which would render the alloy oxidizable to form a thin oxide surface film when heated in a neutral or reducing atmosphere containing traces of oxygen, coating said member with a protective layer composed only of an alloy composed of copper and metal from the group consisting of iron, cobalt and nickel, and brazing said member without flux in said neutral or reducing atmosphere to another member which has a surface composed only of metal which is non-oxidizable when heated in this atmosphere.

6. A method of making a fabricated structure comprising providing a member composed of a copper base alloy containing an appreciable amount of metal from the group consisting of beryllium and aluminum, coating said member with a protective layer composed only of an alloy composed of copper and metal from the group consisting of iron, cobalt and nickel, and brazing said member without flux in a neutral or reducing atmosphere to another member which has a surface composed only of metal which is non-oxidizable when heated in this atmosphere.

7. A method of making a fabricated structure comprising providing a member composed of a copper base alloy containing an appreciable amount of beryllium, providing on said member a surface composed only of metal from the group consisting of iron, cobalt and nickel, and brazing said metal without a flux in a neutral or reducing atmosphere to another member which has a surface composed only of metal which is non-oxidizable when heated in this atmosphere.

8. A method of making a fabricated structure comprising providing a member composed of a copper base alloy containing an appreciable amount of beryllium, coating said member with a protective layer composed only of metal from the group consisting of iron, cobalt and nickel, and brazing said member without a flux in a neutral or reducing atmosphere to another member which has a surface composed only of metal which is non-oxidizable when heated in this atmosphere.

9. A brazed article comprising a plurality of members secured together by brazing without a flux in a neutral or reducing atmosphere whereby the finished joint is free of flux, said members having joined surfaces composed only of a copper alloy which is non-oxidizable to form a thin oxide surface film when heated in a neutral or reducing atmosphere containing traces of oxygen, and at least one of said members being composed except for said surface of a copper base alloy containing an appreciable amount of metal from the group consisting of beryllium and aluminum.

10. A brazed article comprising a plurality of members secured together by brazing without a flux in a neutral or reducing atmosphere whereby the finished joint is free of flux, said members having joined surfaces composed only of an alloy composed of copper and metal from the group consisting of iron, cobalt and nickel, and at least one of said members being composed except for said surface of a copper base alloy which is oxidizable to form a thin oxide surface film when heated in a neutral or reducing atmosphere containing traces of oxygen.

11. A brazed article comprising a plurality of members secured together by brazing without a flux in a neutral or reducing atmosphere whereby the finished joint is free of flux, at least one of said members being composed of a copper base alloy containing an appreciable amount of beryllium and having a surface composed only of metal from the group consisting of iron, cobalt and nickel, and which surface is joined by said brazing to a surface of another member, said latter surface being composed only of metal which is non-oxidizable to form a thin oxide film when heated in a neutral or reducing atmosphere containing traces of oxygen.

HORACE F. SILLIMAN.